UNITED STATES PATENT OFFICE.

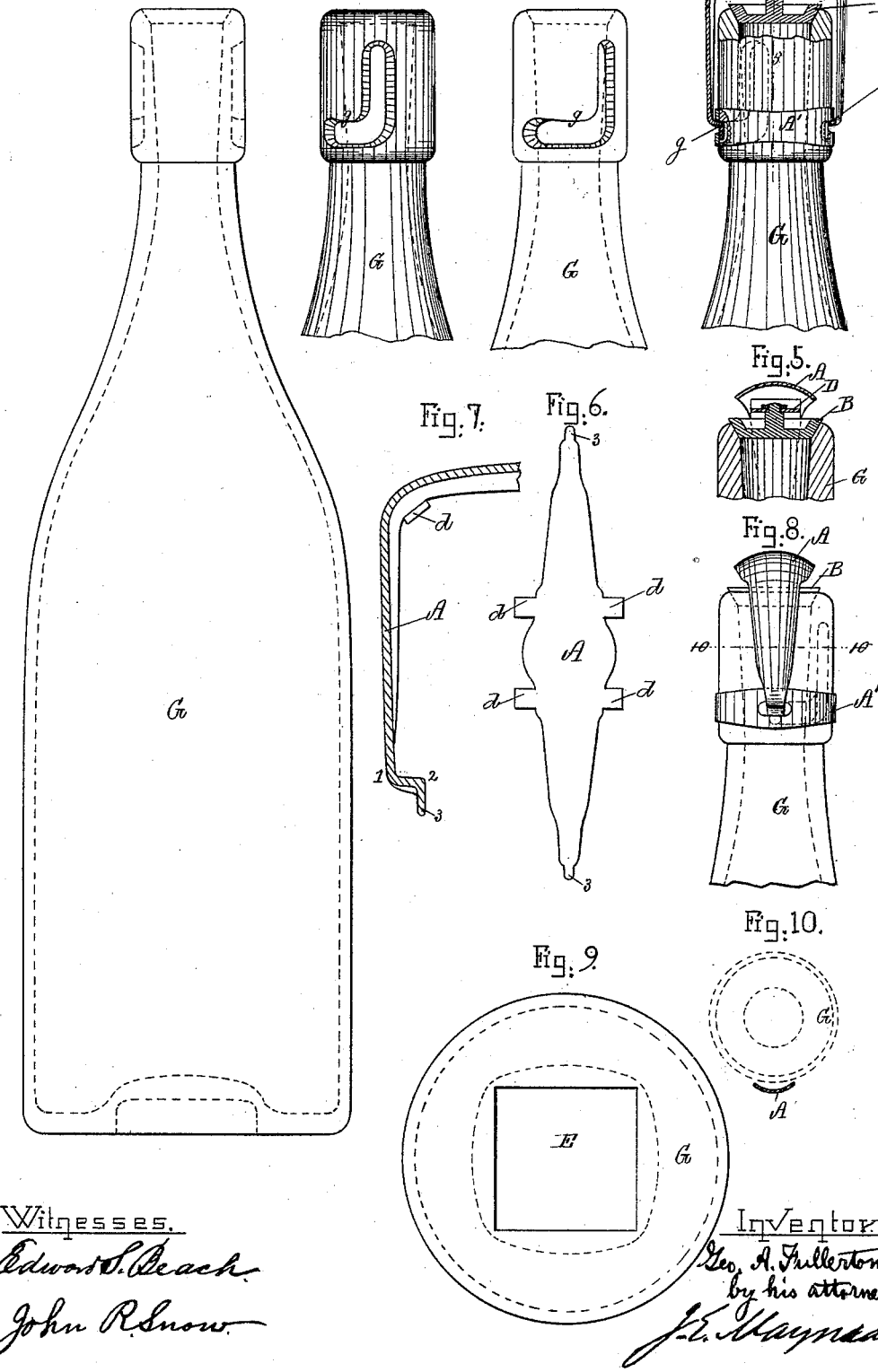

GEORGE A. FULLERTON, OF BOSTON, MASSACHUSETTS, ASSIGNOR TO THE FACILE BOTTLE STOPPLE COMPANY, OF NEW YORK, N. Y.

BOTTLE-STOPPER.

SPECIFICATION forming part of Letters Patent No. 390,586, dated October 2, 1888.

Application filed January 13, 1888. Serial No. 260,621. (No model.)

*To all whom it may concern:*

Be it known that I, GEORGE A. FULLERTON, of Boston, in the county of Suffolk and State of Massachusetts, have invented an Improved Bottle-Stopper, of which the following is a specification, reference being had to the accompanying drawings, making a part hereof, in which—

Figure 1 is an elevation, partly in section, showing the head and neck of a bottle with one of my bottle-stoppers in place. Figs. 2 and 3 are elevations of the head and neck of one of my bottles, one elevation being at an angle of one hundred and eighty degrees from the other. Fig. 4 is an elevation of the whole bottle. Fig. 5 is a section on line 5 5 of Fig. 1. Fig. 6 is a plan of the sheet-metal blank from which the bail A is struck up. Fig. 7 is an enlarged central section of half the bail. Fig. 8 is an elevation showing the bail in side view. Fig. 9 is a bottom view of the bottle; and Fig. 10 is a section on line 10 10 of Fig. 8, illustrating the rounding leg of the bail.

My present invention is an improvement upon the invention described in my patent, No. 373,973, dated November 29, 1887; and the main feature of my present invention consists in the combination of the stopple and its bail by means of a spring held to the bail by ears, a projection from the stopple passing up through the spring.

In practice I prefer to make the stopple B of metal coated with a compound familiar to all skilled in the art of making what is called "agate" or "granite ware," or "marbleized iron," and to grind them true, the mouth of the bottle being also ground, so as to make a perfect joint; but, as will be clear, when the stopple is covered with or made of cork, rubber, or the like, this grinding will be unnecessary.

The spring D is held in place by the ears *d* upon the bail A, and the stopple B and spring D are held together by a rivet, and when the stopple is non-elastic I prefer to make the neck of the rivet and the hole through the spring non-circular; but this is immaterial when the stopple is made in whole or in part of compressible material.

In order to lock the bail A to band A′, the holes in the band A′ are made oblong and the inwardly-turned ends of the bail are formed with a projection, 3, so that the inwardly-turned portions 2 3 of the bail cannot be inserted through the oblong holes in the band A′ except when the bail is at right angles to its position shown in Figs. 1 and 8; but when the bail is at right angles to its position, as shown in Figs. 1 and 8, its legs can be slightly sprung apart and the inwardly-turned ends 2 3 will snap into place through the holes in the band A′.

What I claim as my invention is—

1. In a bottle-stopper, the combination of bail A, ears *d*, spring D, and stopple B, substantially as described.

2. In a bottle-stopper, the bail A, having the shoulder 2, and projection 3 from that shoulder, in combination with band A′, the hole in which is made oblong to receive shoulder 2, with its projection 3, as and for the purpose specified.

GEO. A. FULLERTON.

Witnesses:
J. E. MAYNADIER,
JOHN R. SNOW.